United States Patent [19]

Biswas

[11] Patent Number: 5,355,986
[45] Date of Patent: Oct. 18, 1994

[54] CLUTCH AND DISC BRAKE FRICTION ASSEMBLY

[75] Inventor: Chandi P. Biswas, Prattville, Ala.

[73] Assignee: Prattville Manufacturing, Inc., Prattville, Ala.

[21] Appl. No.: 68,437

[22] Filed: May 27, 1993

[51] Int. Cl.⁵ .................. F16D 69/04; F16D 69/00
[52] U.S. Cl. .................................. 192/107 R; 188/258
[58] Field of Search ............... 192/107 R, 107 M; 188/251 A, 258

[56] References Cited

U.S. PATENT DOCUMENTS

| | | |
|---|---|---|
| 1,880,750 | 10/1932 | Brackett ..................... 188/258 X |
| 1,950,260 | 3/1934 | Nelson . |
| 2,125,524 | 8/1938 | Smith ....................... 192/107 M |
| 2,519,865 | 8/1950 | Wellman . |
| 2,733,797 | 2/1956 | Almen et al. . |
| 2,850,118 | 9/1958 | Byers . |
| 2,911,074 | 11/1959 | Fraula et al. ................ 188/258 X |
| 3,037,860 | 6/1962 | Masterson et al. . |
| 3,390,750 | 7/1968 | Albertson . |
| 3,425,524 | 2/1969 | Dewar . |
| 3,425,935 | 4/1969 | Warman . |
| 3,452,844 | 7/1969 | Lallemant . |
| 3,477,551 | 11/1969 | Beuchle et al. . |
| 3,478,849 | 11/1969 | Hahm . |
| 3,526,306 | 9/1970 | Bentz et al. . |
| 3,747,712 | 7/1973 | Stout . |
| 3,751,330 | 8/1973 | Gilbert ..................... 188/251 A X |
| 3,920,108 | 11/1975 | Ely . |
| 3,927,241 | 12/1975 | Augustin . |
| 3,939,946 | 2/1976 | Pierre et al. . |
| 3,941,221 | 3/1976 | Pringle . |
| 4,049,090 | 9/1977 | Buell . |
| 4,154,900 | 5/1979 | Kaku et al. . |
| 4,276,969 | 7/1981 | Chin et al. . |
| 4,278,153 | 7/1981 | Venkatu . |
| 4,569,424 | 2/1986 | Taylor, Jr. . |
| 4,781,275 | 11/1988 | Olsen ........................ 192/107 M X |
| 4,799,579 | 1/1989 | Myers et al. . |
| 4,830,164 | 4/1989 | Hays . |
| 5,123,514 | 6/1992 | Gatins, Jr. . |

FOREIGN PATENT DOCUMENTS

| | | |
|---|---|---|
| 576106 | 5/1959 | Canada ......................... 188/258 |
| 1165010 | 10/1958 | France . |
| 0080531 | 7/1981 | Japan ......................... 188/251 A |
| 1210860 | 11/1970 | United Kingdom . |
| 2017833A | 10/1979 | United Kingdom . |

Primary Examiner—Rodney H. Bonck
Attorney, Agent, or Firm—Leydig, Voit & Mayer, Ltd.

[57] ABSTRACT

A clutch and disc brake friction assembly is provided for use on medium and heavy duty vehicles and includes a metallic shoe having an exposed backing surface provided with a plurality of relatively spaced protuberances projecting therefrom. A sheet metal attachment lamina overlies the backing surface and is provided with a plurality of holes through which the protuberances extend. Subsequent to the distal ends of the protuberance having passed through the holes, they are enlarged thereby affixing the attachment lamina to the backing surface. The attachment lamina has a plurality of openings relatively arranged to form a grid-like configuration. The openings are separated from one another by narrow elongated segments each having a V cross-sectional configuration with the sides thereof diverging from the shoe backing surface. A high temperature adhesive lamina overlies the backing surface and the divergent sides of the narrow elongated segments of the attachment lamina. A friction lamina overlies the adhesive lamina and the attachment lamina whereby the divergent sides of the elongated segments and the adhesive lamina become embedded in the friction lamina.

12 Claims, 1 Drawing Sheet

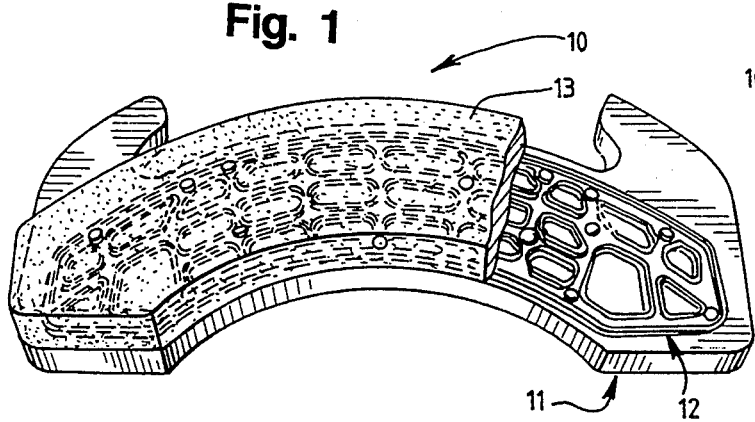
Fig. 1
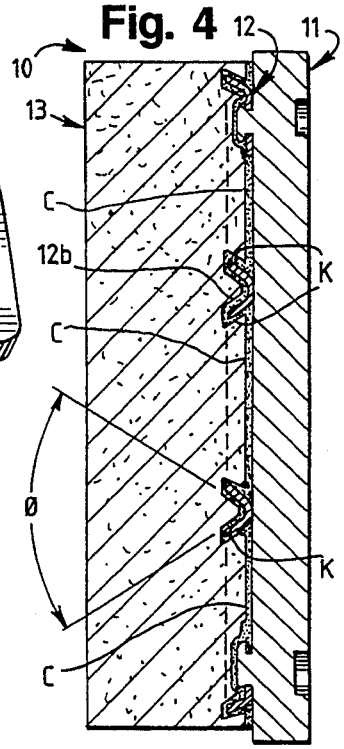
Fig. 4
Fig. 2
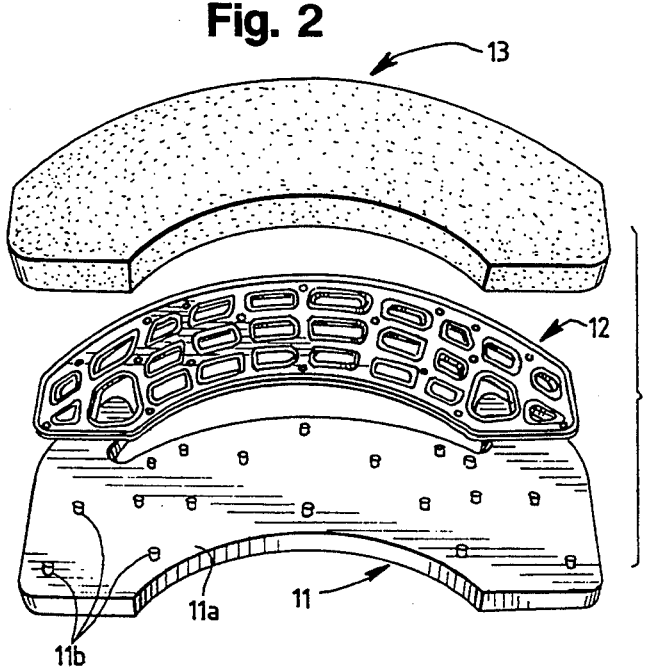
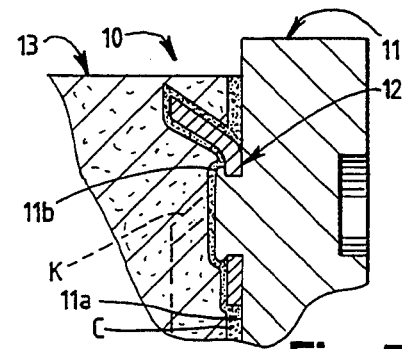
Fig. 5
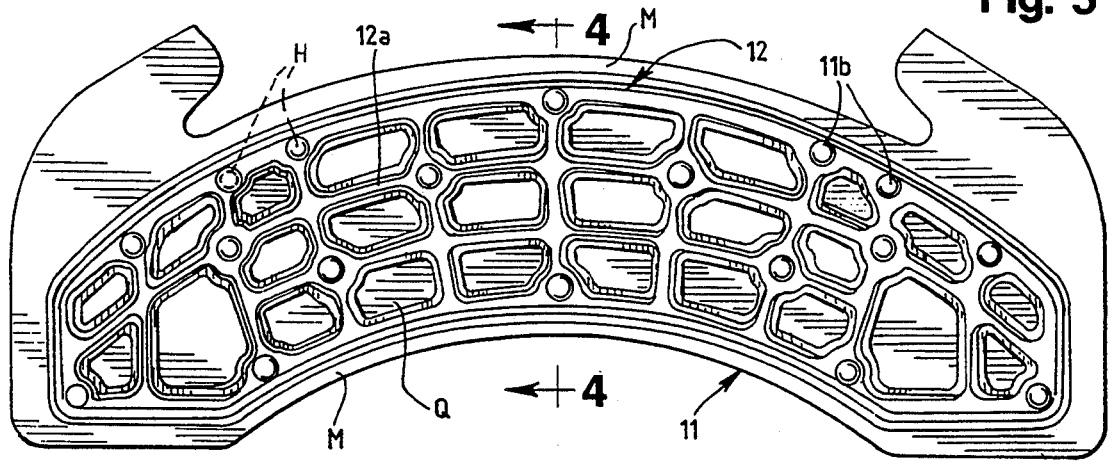
Fig. 3

CLUTCH AND DISC BRAKE FRICTION ASSEMBLY

FIELD OF THE INVENTION

The invention related to a clutch and disc brake friction assembly for use in medium and heavy duty vehicles such as school buses and over-the-highway trucks and the like.

BACKGROUND OF THE INVENTION

Traditionally, assemblies of this general type have secured the disc pads to the shoe backing surface by either heat cured adhesives or by mechanical means such as rivets. The riveted pads were utilized mostly in passenger automobiles and light duty trucks. The adhesive bonding of the pads, on the other hand, was normally incorporated in heavier duty vehicles. In the latter installations, the disc pads frequently became very hot and remained in such a state for prolonged periods of time particularly where the vehicle was subjected to severe stop and go conditions. Under such conditions gradual deterioration of the adhesive bonding occurred resulting in debonding of the pads due to heavy loading and/or vibration.

Several mechanical attachment systems have heretofore been utilized in conjunction with an adhesive and embody perforated sheet metal or wire mesh spot welded to a metal carrier plate. The perforated sheet metal or wire mesh is then embedded in the molded disc pad. Such prior mechanical attachments are beset with one or more of the following shortcomings: a) ineffective locking of the pad to the carrier plate; b) inconsistency in the strength of spot welds securing the wire mesh to the carrier plate; and c) inordinately high manufacturing costs.

SUMMARY OF THE INVENTION

Thus, an improved clutch and disc brake friction system has been provided which avoids the aforenoted shortcomings associated with the prior systems.

The improved friction system is suitable for use in both medium and heavy duty vehicles.

The improved friction system embodies significantly higher bond strength which is maintained even after the system has been subjected to severe operating conditions and substantial deterioration of the adhesive has occurred.

The shoe backing surface in the improved friction system provides enhanced stiffness to the pad because no rivet holes are required to be formed in the backing surface.

Assembly of the improved friction system is facilitated because fewer independent components comprise the system.

Further and additional advantages inherent in the improved clutch and disc brake friction system will become apparent from the description, accompanying drawings and appended claims.

In accordance with one embodiment of the invention an improved clutch and disc brake friction system is provided for use on medium and heavy duty vehicles. The system includes a metallic shoe having an exposed backing surface provided with a plurality of relatively spaced protuberances. Except for the protuberances, the backing surface is substantially planar. Overlying the backing surface is an attachment lamina, sometimes referred to as a carrier plate, which is provided with a plurality of holes through which the distal ends of the protuberances extend. Subsequent to the distal ends having been extended through the corresponding holes, the distal ends are enlarged or distorted relative to the hole sizes resulting in the attachment lamina being affixed to the backing surface.

The attachment lamina is also provided with a plurality of relatively spaced openings arranged to form a grid-like configuration. The adjacent openings are separated from one another by narrow elongated segments. Each segment has a generally V-shaped configuration with the apex of the V in contact with the backing surface and the sides of the V diverging therefrom. A high temperature adhesive lamina is applied to the backing surface exposed between the elongated segments and to the divergent sides of the segments. A friction lamina, sometimes referred to as a disc pad, is molded in overlaying relation with the attachment lamina and adhesive lamina whereby the divergent sides of the elongated segments are embedded within the friction lamina.

BRIEF DESCRIPTION OF THE DRAWINGS

The present invention may be more clearly understood from the following detailed description of a specific and preferred embodiment read in conjunction with the accompanying drawings, wherein:

FIG. 1 is a fragmentary perspective view of one embodiment of the friction assembly;

FIG. 2 is similar to FIG. 1 but showing the various components of the friction assembly in exploded relation;

FIG. 3 is a plan view of the attachment lamina shown secured to the shoe backing surface and with the friction lamina removed;

FIG. 4 is a fragmentary enlarged sectional view taken along line 4—4 of FIG. 3, but also showing the friction lamina adhered in place; and FIG. 5 is an enlarged fragmentary sectional view of a portion of FIG. 4.

It should also be recognized that actual embodiments of the clutch and disc brake friction assembly of the present invention may differ substantially from that portrayed, depending in part upon the particular vehicle for which the assembly is designed. Such detail is considered well within the comprehension of those skilled in the art in the light of the present disclosure and without further amplification. It should be understood, of course, that the invention is not limited to the particular embodiments illustrated.

DETAILED DESCRIPTION OF THE DRAWINGS

Referring now to drawings and more particularly to FIGS. 1, 2, 4 and 5 one embodiment of the improved clutch and disc brake friction assembly 10 is shown which is suitable for use in medium and/or heavy duty vehicles. Examples of such vehicles would be a school bus as representing medium duty and an over-the-highway truck as representing heavy duty.

Assembly 10, as seen more clearly in FIG. 2 includes a shoe 11 formed of the suitable metal (i.e. steel). The shape and size of the shoe will depend upon the type of vehicle in which it is installed. The shoe is provided with a backing surface 11a normally having a planar configuration except for a plurality of relatively spaced protuberances or studs 11b. Each protuberance may be extruded or formed on the backing surface at the time the shoe itself is being formed by stamping or the like. Each protuberance initially has a cylindrical shape and may be about 0.187" in diameter and have a height of about 0.064". It is preferred to have a ratio of at least one protuberance per three square inches of backing surface 11a.

In addition to the shoe 11, the assembly 10 includes an attachment lamina 12, sometimes referred to as a carrier, which overlies and is affixed to the backing surface 11a. Lamina 12, as seen more clearly in FIGS. 2 and 3, is preferably formed from sheet metal having a thickness of about 0.043" and is provided with a plurality of relatively spaced holes H. Each hole is sized and located relative to the protuberances 11b so that when the lamina 12 is assembled with the backing surface 11a, the distal end portions of the protuberances will extend through corresponding holes. Once the distal ends of all the protuberances have been inserted through the holes, the distal ends are simultaneously compressed causing the ends to be enlarged to such an extent that they will no longer pass through the holes, thus fixedly securing the lamina 12 to the backing surface.

Besides the holes H, lamina 12 is provided with a plurality of relatively large openings Q which are arranged so as to form a grid-like configuration having about 70-95% open area, e.g., about 90%. Adjacent openings Q are separate from one another by narrow elongated segments or ribs 12a, each of which preferably has a substantially V shape in cross-section, as portrayed, for example, in FIG. 4. Each segment has sides or flanges 12b which extend divergently away from the backing surface 11a so that the outer edge of each side is preferably spaced about 0.080" to 0.120", e.g., about 0.100" from the backing surface or about twice the thickness of the attachment lamina sheet metal, when the lamina 12 is affixed thereto. The angle of divergence Θ or the angle included between the sides of each segment, is preferably from about 45° to about 90°, e.g., about 60°.

While the internal apex of the generally V-shaped cross-section of the ribs 12a is portrayed in FIG. 4 as a small flat surface, those skilled in the art will recognize that functionally a curved apex or pointed apex or vertex are equivalents. Accordingly, the term V-shaped should be broadly construed, consistent with the disclosed keying function of the ribs 12a hereinafter set forth. The apexes in FIGS. 1-3 are not shown in detail because of the small scale thereof.

The periphery of the attachment lamina 12 is preferably recessed a short distance from the periphery of the backing surface 11a thereby forming a continuous margin M on the backing surface as viewed in FIG. 3.

Once the attachment lamina 12 has been affixed to the backing surface 11a by enlarging the distal ends of the protuberances 11b as afore-described, a thin coating C of an adhesive capable of withstanding high temperatures (e.g., about 500° F. or more) is applied to the exposed surfaces of the lamina 12 and to the portions of the backing surface 11a to which friction lamina 13 is to be adhered including the surfaces which are exposed within the openings Q. The coating C serves a dual function: a) it provides a bond between the lamina 12 and a friction lamina 13, as will be discussed more fully hereinafter; and b) eliminates, or significantly reduces, corrosion and/or oxidation of the backing surface 11a and the attachment lamina 12 which might occur at a bond line formed therebetween.

Once the coating C has been applied, the friction lamina 13, sometimes referred to as a disc pad, is molded onto the outwardly facing side of the fixedly secured lamina 12. Because of the divergence of the sides 12b of each V-shaped segment 12a, portions of the friction lamina 13 form keys K which cooperate with one another to securely retain the friction lamina 13 in place on the exposed surface of the carrier 12 and the backing surface 11a. In addition to the keying effect, the coating C coacts with the friction lamina 13 to bond the latter to the carrier 12 and backing surface 11a. Thus, even though the coating C has deteriorated after being subjected for a long period of time to severe operating conditions, significant bonding strength still remains thereby extending the useful life of the assembly.

The size and shape of the various components comprising the improved assembly may vary from that shown while still remaining within the scope of the claimed invention. The improved assembly incorporates relatively few, simple components; is easy to install as either new or replacement equipment, and may be sized to fit a variety of vehicles. Furthermore the improved system may be utilized in either a friction clutch and/or disc braking structure.

As is apparent from the above description, the clutch and disc brake friction assembly of the present invention overcomes shortcomings of the prior art and otherwise achieves the various objects of the present invention as previously set forth.

It is to be understood that allowed claims based on this disclosure are to be accorded a range of equivalents commensurate in scope with the advance made over the prior art.

Having described in the invention, what is claimed is:

1. A clutch and disc brake friction assembly suitable for use on medium and heavy duty vehicles comprising a metallic shoe having an exposed backing surface with a plurality of relatively-spaced, integrally-formed protuberances projecting therefrom; an attachment lamina substantially overlying said backing surface and having a plurality of holes formed therein through which the distal ends of said protuberances extend, the distal end of each protuberance being enlarged whereby said attachment lamina is fixedly secured to said backing surface, said attachment lamina having a plurality of relatively-large openings relatively arranged so as to form a grid-like configuration, adjacent openings being separated from one another by relatively-narrow elongated segments each having sides which extend divergently away from the adjacent backing surface of said shoe; a high temperature adhesive lamina substantially overlying the shoe backing surface exposed between the elongated segments and the upper exposed surfaces of said attachment lamina, including the divergent sides of the elongated segments of said attachment lamina; and a friction lamina overlying said adhesive lamina and said attachment lamina whereby the divergent sides of said elongated segments and the adhesive lamina are embedded therein.

2. The clutch and disc brake friction assembly of claim 1 wherein, except for the plurality of protuberances, the shoe backing surface is substantially planar and said protuberances are substantially perpendicular thereto.

3. The clutch and disc brake friction assembly of claim 1 wherein each elongated segment of said attachment lamina has a substantially V cross-sectional configuration.

4. The clutch and disc brake friction assembly of claim 3 wherein the attachment lamina is formed of sheet metal and the sides of the elongated segments defining the V cross-sectional configuration form an included angle from about 45° to about 90°.

5. The clutch and disc brake friction assembly of claim 4 wherein an apex of each segment with a V cross-sectional configuration engages the shoe backing surface and the height of each elongated segment measured perpendicularly from the shoe backing surface is about twice the thickness of the attachment lamina sheet metal.

6. The clutch and disc brake friction assembly of claim 1 wherein the grid-like configuration of the attachment lamina has about 70–95% open area.

7. The clutch and disc brake friction assembly of claim 1 wherein the perimeter of the attachment lamina is recessed a predetermined amount from the perimeter of said shoe backing surface forming thereon a substantially continuous narrow margin.

8. The clutch and disc brake friction assembly of claim 7 wherein the outer extremities of said divergent sides are inwardly spaced from the adjacent side surfaces of said friction lamina.

9. A clutch and disc brake friction assembly suitable for use on medium and heavy duty vehicles comprising a metallic shoe having an exposed backing surface with a plurality of relatively-spaced, integrally-formed, substantially-perpendicular protuberances projecting from the otherwise-substantially-planar surface thereof; an attachment lamina substantially overlying said backing surface and having a plurality of holes formed therein which register with said protuberances and through which the distal ends of said protuberances extend, the distal end of each protuberance being enlarged whereby said attachment lamina is fixedly secured to said backing surface, said attachment lamina having a plurality of relatively-large openings relatively arranged so as to form a grid-like configuration, adjacent openings being separated from one another by relatively-narrow elongated segments each having sides which extend divergently away from the adjacent backing surface of said shoe; a high-temperature adhesive lamina substantially overlying the exposed portions of said backing surface and said attachment lamina, including the divergent sides of said elongated segments; and a friction lamina overlying said adhesive lamina and said attachment lamina whereby the divergent sides of said elongated segments and the adhesive lamina are embedded therein and said friction lamina is bonded to said attachment lamina and said backing surface.

10. The clutch and disc brake friction assembly of claim 9 wherein said attachment lamina is sheet metal and each elongated segment has a substantially V cross-sectional configuration forming an included angle from about 45° to about 90°.

11. The clutch and disc brake friction assembly of claim 9 wherein the perimeter of the attachment lamina is recessed a predetermined amount from the perimeter of said shoe backing surface forming thereon a substantially continuous narrow margin.

12. The clutch and disc brake friction assembly of claim 11 wherein the outer extremities of said divergent sides are inwardly spaced from the adjacent side surfaces of said friction lamina.

* * * * *